(12) United States Patent
Baskaran

(10) Patent No.: US 9,400,557 B2
(45) Date of Patent: Jul. 26, 2016

(54) MULTIMODAL HAPTIC EFFECT SYSTEM

(71) Applicant: Intel Corporation, Santa Clara, CA (US)

(72) Inventor: Rajashree Baskaran, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/314,806

(22) Filed: Jun. 25, 2014

(65) Prior Publication Data

US 2015/0378434 A1    Dec. 31, 2015

(51) Int. Cl.
G06F 3/01    (2006.01)

(52) U.S. Cl.
CPC ...................... G06F 3/016 (2013.01)

(58) Field of Classification Search
CPC ........................................ G06F 3/016
USPC ................................. 345/156–184
See application file for complete search history.

(56) References Cited

U.S. PATENT DOCUMENTS

| | | | | |
|---|---|---|---|---|
| 8,917,167 | B1 * | 12/2014 | Selker | G06F 3/016 340/407.1 |
| 9,086,728 | B2 * | 7/2015 | Roselier | F15B 15/00 |
| 2003/0117371 | A1 * | 6/2003 | Roberts | G06F 3/014 345/156 |
| 2009/0181724 | A1 * | 7/2009 | Pettersson | G06F 3/016 455/566 |
| 2009/0211645 | A1 * | 8/2009 | Bohringer | B01L 3/50273 137/13 |
| 2010/0141407 | A1 | 6/2010 | Heubel et al. | |
| 2010/0171719 | A1 * | 7/2010 | Craig | G06F 3/0202 345/173 |
| 2010/0328251 | A1 | 12/2010 | Sinclair | |
| 2012/0229401 | A1 * | 9/2012 | Birnbaum | G06F 3/016 345/173 |
| 2012/0318369 | A1 * | 12/2012 | Bohringer | B01L 3/50273 137/13 |
| 2013/0215065 | A1 * | 8/2013 | Radivojevic | G06F 3/045 345/173 |
| 2013/0241860 | A1 | 9/2013 | Ciesla et al. | |
| 2014/0071079 | A1 * | 3/2014 | Heubel | G06F 3/041 345/173 |
| 2014/0104165 | A1 * | 4/2014 | Birnbaum | G06F 3/016 345/156 |
| 2014/0132532 | A1 | 5/2014 | Yairi et al. | |
| 2014/0144518 | A1 * | 5/2014 | Bohringer | B01L 3/50273 137/13 |
| 2014/0320436 | A1 * | 10/2014 | Modarres | G06F 3/0412 345/173 |
| 2015/0199937 | A1 * | 7/2015 | Blumert | G06F 3/016 345/105 |

FOREIGN PATENT DOCUMENTS

KR    10-2011-0098932 A    9/2011

OTHER PUBLICATIONS

International Search Report and Written Opinion received for International Patent Application No. PCT/US2015/033143, mailed on Aug. 17, 2015, 12 pages.
Duncombe et al., "Controlling Liquid Drops with Texture Ratchets", Materials Views, Advanced Materials, 2012, pp. 1545-1550.
Erdem et al., "Vibration Induced Droplet Generation on Textured Surfaces", 3Components Research, Intel Corporation, Jan. 13-17, 2008, pp. 603-606.

* cited by examiner

Primary Examiner — Dmitriy Bolotin
(74) Attorney, Agent, or Firm — Alpine Technology Law Group LLC

(57) ABSTRACT

A device to output a haptic effect includes a haptic effect generator comprising one or more microdroplets of a fluid configured to output a haptic effect, and a substrate configured to control movement of the one or more microdroplets of fluid. The device further includes an actuator coupled to the haptic effect generator configured to exert one or more forces on the substrate to cause the one or more microdroplets of fluid to output the haptic effect.

25 Claims, 11 Drawing Sheets

MULTIMODAL HAPTIC EFFECT SYSTEM

TECHNICAL FIELD

Examples described herein generally relate to methods, systems, and devices to provide a multimodal haptic response system for a mobile device.

BACKGROUND

Haptic motors in today's phones, tablets and other haptic effect enabled devices are mainly Linear Rotation Actuators (LRA) or Eccentric Rotation Mass Motors (ERM). Such haptic motors are relatively large and high power consuming as well as being limited in their frequency response by having narrow operational bandwidth. In order to achieve complex haptic signals more than one motor needs to be used in conjunction with complex algorithms, which is impractical due to size and power constraints in mobile platforms.

BRIEF DESCRIPTION OF THE DRAWINGS

The various advantages of the embodiments will become apparent to one skilled in the art by reading the following specification and appended claims, and by referencing the following drawings, in which:

DETAILED DESCRIPTION

Figure 1:
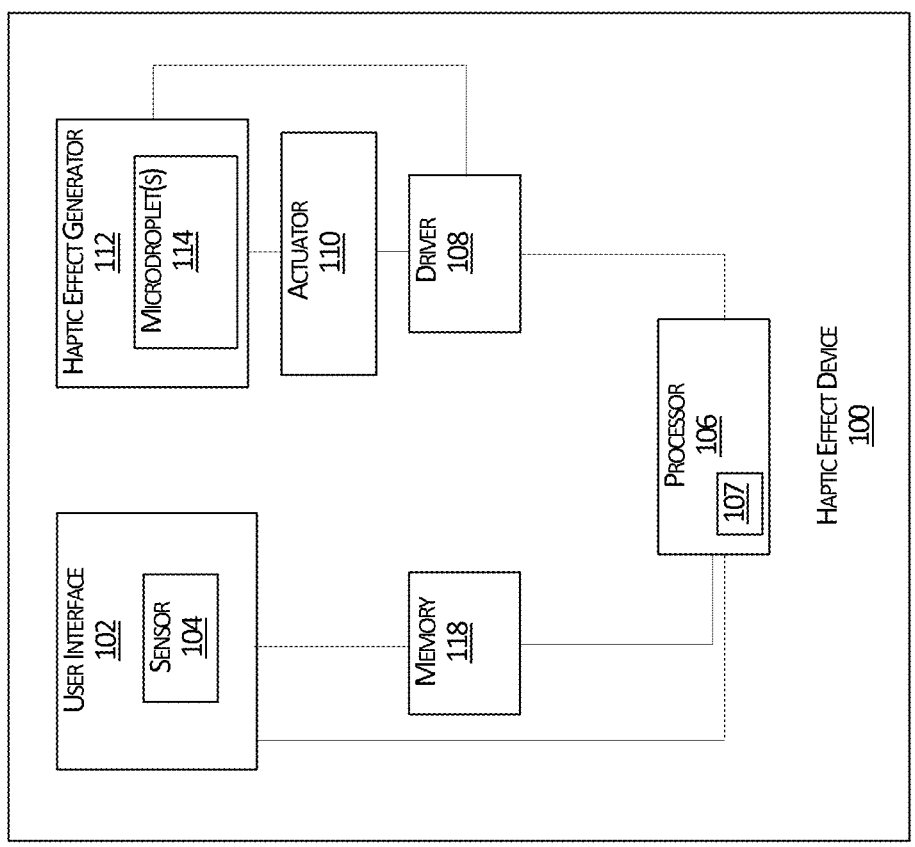
FIG. 1 is a block diagram illustrating an example of a haptic effect device.

FIG. 1 is a block diagram illustrating an example of a haptic effect device 100. Haptic effect device 100 may comprise a user interface 102 which may be configured to receive and communicate input data to a processor 106. Processor 106 may be configured to process the input data from user interface 102 and/or a memory 118 and associate the input data with one or more haptic effects. Processor 106 may be configured to select one or more commands from one or more available commands associated with the one or more haptic effects wherein the one or more commands may each be associated with a different haptic effect and wherein the different haptic effects may each comprise a different mode. The different modes may vary spatially, temporally, and/or by frequency and/or amplitude. Various haptic effect modes may include execution at two or more different frequencies simultaneously. Processor 106 may comprise a sub-processor such as a sensor actuator fusion core 107. Sensor actuator fusion core 107 may be configured to process data related to generation of haptic effects independently of processor 106.

In an example, processor 106 may send the one or more commands to driver 108. Driver 108 may drive actuator 110 based on the one or more commands. Actuator 110 may be coupled to haptic effect generator 112 which may be configured to output one or more haptic effects. Actuator 110 may comprise a single actuator or may comprise two or more actuators. Actuator 110 may be configured to exert a variety of forces on haptic effect generator 112 to actuate a variety of haptic effects thus providing multimodal and/or multi-frequency haptic effects. One or more forces may be associated with a particular haptic effect and may include one or more vibrations, electrostatic forces, electrical signals, sound waves, heat, compression, physical forces or the like, or combinations thereof. In another example, driver 108 may be coupled to haptic effect generator 112 and may send one or more electrical signals to haptic effect generator 112 to generate one or more haptic effects.

In an example, haptic effect generator 112 may comprise a system of one or more microdroplets 114 in an array. Microdroplets 114 may be small drops of fluid, a combination of fluid and fine particles that behave as a fluid and/or fine particles that behave as a fluid on a microliter and/or milliliter scale or less and may be configured to output haptic effects responsive at least in part to the forces exerted by actuator 110, by a surface in contact with microdroplets 114, by a composition of the surface, by a composition of the microdroplets 114 and/or by electrostatic forces between the one or more microdroplets and the substrate, or by the like or combinations thereof. In an example, the fine particles may be solid and/or semi-solid.

In an example, microdroplets 114 may be controlled using microfluidics principals. Microfluidics herein refers to design and control of systems involving small volumes of fluid and/or fine particles. Microfluidics may also refer to adjusting the behavior of fluid, precisely controlling and manipulating fluid and/or fine particles that are geometrically constrained to a sub-millimeter scale. Microfluidics may involve manipulating discrete volumes of fluid and/or fine particles to generate, transport, vibrate, merge and split microdroplets of fluid in order to manipulate and/or control one or more microdroplets such as microdroplets 114 to provide one or more haptic effects. Microdroplets 114 may be configured to output haptic effects in one or more frequencies and/or modes and may be spatially and temporally complex. Microdroplets 114 may be produce a haptic effect responsive to exposure to and/or induction of two or more simultaneous frequencies.

In an example, haptic effect device 100 may be any of a variety of devices enabled to output one or more haptic effects. For example, haptic effect device 100 may comprise a video game controller, a wristband, a mobile communications device, a mobile computing device, a tablet, a notebook, a detachable slate device, an Ultrabook™ system, a wearable communications device, a personal computer, a wearable computer, a smart shoe, an entertainment device, an electronic device, a wearable electronic device, and/or the like or a combination thereof. In such devices, haptic effects may be transmitted through any surface of the device, for example, a screen, a backside, a corner, an edge, a top side, a bottom side, a left or right side, or the like or a combination thereof. Additionally, haptic effects may include heating and/or cooling of microdroplets 114.

In an example, user interface 102 and/or sensor 104 may be disposed in or on haptic device 100. In another example, user interface 102 and/or sensor 104 may be separate from haptic device 100. In an example, user interface 102 may be configured to receive a user input such as a physical input, a button push, a trigger actuation, a haptic input, an audio input, a preset input and/or trigger, a thermal input and/or the like or a combination thereof. In an example, user interface 102 may comprise a touchscreen, a keyboard, a button, a wheel, a mouse, a touchpad, a microphone and/or the like or combinations thereof. User interface 102 may comprise a sensor 104 and/or sensor 104 may be separate from or together with user interface 102. Sensor 104 may be configured to receive a user input and/or sense one or more physical phenomena such as temperature, light, pressure, sound, motion, moisture, a chemical, an electrical signal, a vital sign and/or the like or a combination thereof. Sensor 104 may comprise any of a variety of sensors such as, a touch sensor, a light sensor, a biometric sensor, a current sensor, a thermal sensor, a pressure sensor and/or the like, or a combination thereon.

In an example, user interface 102 and/or sensor 104 may be coupled to processor 106, sensor actuator fusion core 107 and/or memory 118. Processor 106 and/or sensor actuator fusion core 107 may be configured to receive and process input data and/or sensor data directly from user interface 102 and/or sensor 104 and/or from memory 118. Processor 106 may select a command associated with an algorithm and/or set of instructions to be executed by driver 108 responsive to the input data and/or sensor data. Such an algorithm and/or set of instructions may be configured to cause driver 108 to drive actuator 110. Actuator 110 may cause haptic effect generator 112 to output one or more haptic effects associated with the input data and/or sensor data. In another example, such an algorithm and/or set of instructions may be configured to cause driver 108 to send a signal to haptic effect generator 112 to output one or more haptic effects associated with the input data and/or sensor data. Processor 106 may be configured to optimize the algorithm and/or set of instructions based on input data and/or sensor data. In an example, sensor actuator fusion core 107 may process data independently of processor 104, such as data associated with user interface 102, sensor 104, memory 118, actuator 110 and/or haptic effect generator 112.

In an example, actuator 110 may be coupled to haptic effect generator 112 and may be configured to produce a variety of motions that may be communicated and/or transmitted to microdroplets 114 at various locations in/on haptic effect generator 112. Actuator 110 may cause two microdroplets 114 to vibrate at different frequencies simultaneously and/or may cause any of microdroplets 114 to vibrate at two or more frequencies simultaneously to generate one or more haptic effects. Actuator 110 may convert vertical and/or horizontal vibration to various spatial and temporal frequency outputs. Such motion may be transmitted to one or more microdroplets 114 in haptic effect generator 112 to generate one or more haptic effects.

Figure 2A:
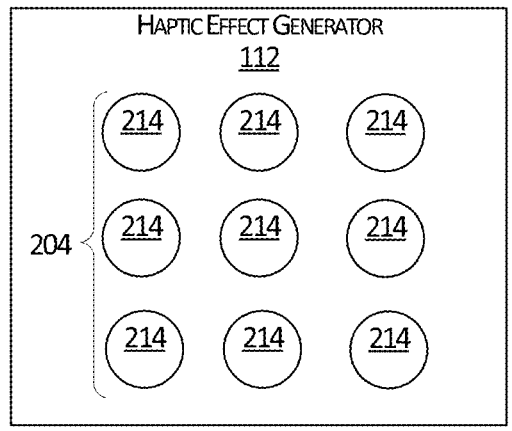
FIG. 2A illustrates a top view of an example of a haptic effect generator comprising an array of microdroplets.

FIG. 2A illustrates a top view of an example of haptic effect generator 112 comprising an array 204 of microdroplets 214. In an example, microdroplets 214 may each comprise a microdroplet of a fluid material such as a liquid, a combination of liquid and fine particles that behave as a fluid, and/or fine particles that behave as a fluid. Such fluid materials may comprise water, a charged oil, stable fluorocarbon oils, silicone oils, bio-compatible silicone oils, an inert oil, any class of chemically stable liquids, and/or the like or a combination thereof. The fine particles that may behave as a fluid may be charged. In an example, the fine particles that may behave as a fluid may be smaller than about 10 μm, larger particles may also work as well.

Figure 2B:
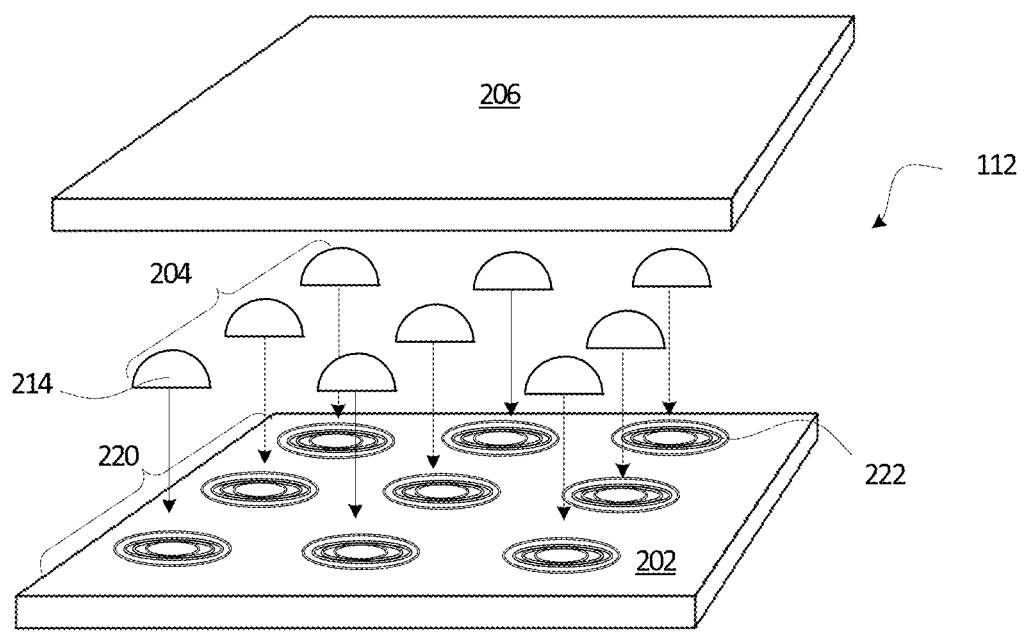
FIG. 2B illustrates an exploded view of an example of a haptic effect generator.

FIG. 2B illustrates an exploded view of haptic effect generator 112. In an example, haptic effect generator 112 may comprise three layers including a substrate 202, an array layer 204 and a membrane 206. Substrate 202 may be made of a variety of materials. Substrate materials may be selected based on their ability to facilitate generation, vibration, transport, merging, splitting, and/or shaping of microdroplets 214. Such materials may comprise a polymer, elastomer, thermoplastic, polydimethylsiloxane (PDMS), silicon coated with fluoro-octyl-trichloro-silane (FOTS), polynorbornene, Teflon™ (polytetrafluoroethylene), fluorinated polyolefins, novolac resin, and/or other hydrophobic material, or the like or a combination thereof. Substrate 202 may be fabricated to generate, control and/or manipulate microdroplets 214. In another example, substrate 202 may comprise one or more different regions. In an example, one region on substrate 202 may comprise a hydrophilic material(s) and a different region on substrate 202 may comprise a hydrophobic material(s). Substrate 202 may be fabricated using microfabrication techniques to pattern hydrophilic and/or hydrophobic regions thereon to control and/or manipulate microdroplets 214.

In an example, membrane 206 may be made of a flexible material such that the motion and/or other features of the microdroplets 214 may be sensed by a user through membrane 206. Such flexible materials may include a thin silicon layer, a polymer, material selected from the PDMS family of materials, material selected from the poly(methyl acrylate) (PMA) family of polymers, an elastomer, latex, carbon fiber and or the like or a combination thereof. Membrane 206 may be configured to enclose one or more microdroplets 214 between substrate 202 and membrane 206. In an example, microdroplets 214 may be microliter and/or milliliter scale microdroplets of fluid each confined between flexible membrane 206 and substrate 202. Membrane 206 may be accessible to and come into contact with a user.

In an example, an array 220 of one or more ring shaped surface structures 222 may be formed on substrate 202. Microdroplets 214 may be disposed on a corresponding ones of structures 222.

There are a large variety of methods of using various vibrational frequencies, hydrophobic, hydrophilic substances and/or various surface characteristics to enable microfluidic control over microdroplets 214. Examples of such fabrication are provided below. However, the examples are not intended to limit claimed subject matter and are used for illustrative purposes only.

Figure 3:
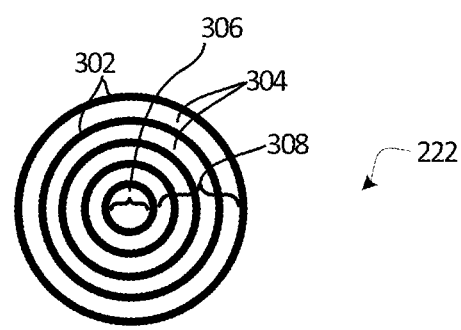
FIG. 3 illustrates an example of a ring-shaped structure.

FIG. 3 illustrates an example ring-shaped structure 222. In an example, structure 222 may comprise one or more mesa structures 302 having one or more ring-shaped wells 304 in between mesa structures 302. Structure 222 may comprise two or more regions having different roughnesses. A first region 306 may be where a center of a microdroplet, such as microdroplet 214 may be disposed. When microdroplet 214 vibrates, microdroplet 214 may expand onto a second region 308 which may have a lower roughness and hence may be relatively less hydrophobic than first region 306. This roughness change may facilitate the motion of a contact line of microdroplet 214 over second region 308. In other examples, rather than circular structures 222, substrate 202 may be fabricated with a texture ratchet or other structures configured to move microdroplets in a particular direction, in a particular pattern or in a particular shape, or the like or combination thereof.

Figure 4:
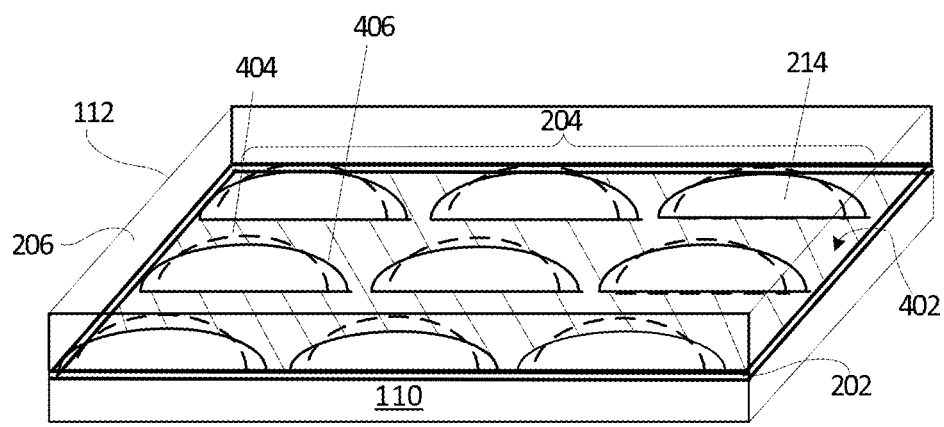
FIG. 4 is a transparent view of an example of an actuator and an example of a haptic effect generator.

FIG. 4 is a transparent view of an example of actuator 110 and haptic effect generator 112. In an example, haptic effect generator 112 may comprise array 204 of microdroplets 214 on substrate 202. In an example, actuator 110 may be in contact with substrate 202. Actuator 110 may comprise a mechanical motor, an electric motor, a pneumatic motor, an electromagnetic linear motor, a servomotor, a comb-drive, a piezoelectric motor and/or other actuating device and may be configured to transmit motion such as vibration to substrate 202. Such motion may be at a variety of frequencies and/or amplitudes and may be controlled by a variety of known methods. Motion actuated by actuator 110 may cause microdroplets 214 to resonate at a variety of frequencies and/or may generate various spatial and temporal frequency outputs.

In an example, microdroplets 214 may be configured to exhibit a variety of modes and may be distributed over a surface 402 of substrate 202 such that haptic effects generated by haptic effect generator 112 may vary spatially and temporally. Microdroplets 214 may be controlled separately and/or in regions containing one or more microdroplets 214. Thus, haptic device generator 112 may exhibit a variety of haptic modes simultaneously and/or consecutively. The shape, movement, vibration, temperature and/or the like of any of microdroplets 214 may be generated and/or controlled based on a number of variable factors in haptic effect generator 112. For example, many different spatial patterns and temporal patterns may be generated by varying actuation frequencies of substrate 202, surface 402 characteristics, surface interaction between microdroplets 214 and the substrate 202 and/or membrane 206, liquid physical properties of the microdroplets 214, contact line of microdroplets 214, electrical signals communicated through substrate 202, volume of microdroplets 214 and/or the like or a combination.

In an example, actuator 110 may transmit vibrations to substrate 202 causing each of microdroplets 214 to vibrate over corresponding ones of circular structures 222. Such vibrating may cause a footprint of each microdroplet 214 to expand (shown in FIG. 4 with solid semi-circles 404) and contract (shown in FIG. 4 with dotted semi-circles 406) at a particular frequency associated with the vibratory frequency of substrate 202. Such expanding and contracting may be sensed through membrane 206 by a user.

Another implementation involves using electrowetting phenomenon to change the wetting property of a fluid in at least one of microdroplets 214 with respect to surface 402 using a potential difference change, for example, voltage controlled actuation, thereby creating different mode shapes and frequencies of response of one or more microdroplets 214. In another example, thermocapillary action and/or optical trapping may be used to manipulate one or more of microdroplets 214.

Figure 5:
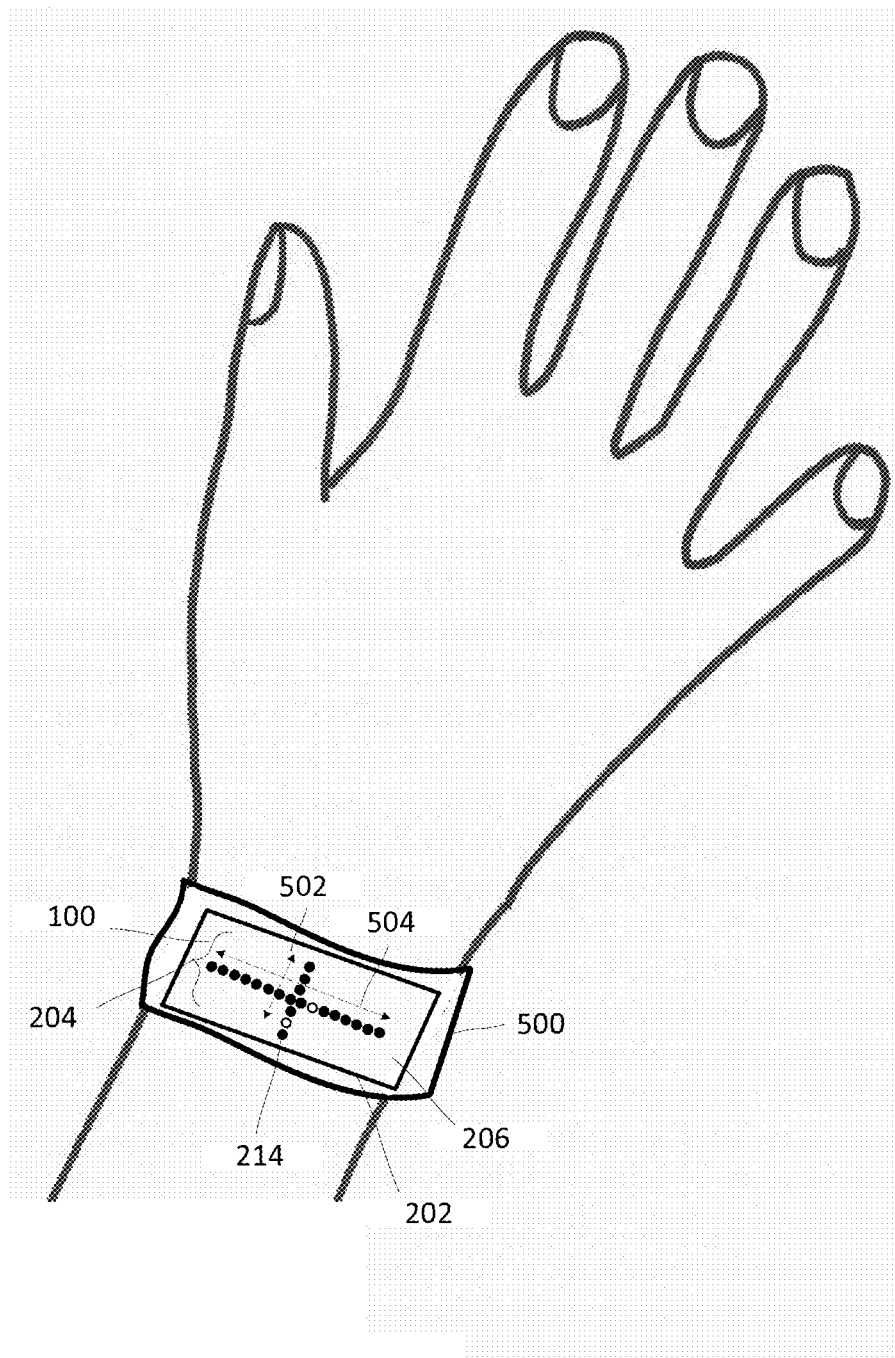
FIG. 5 is a transparent view of an example of a haptic effect device comprising a example of a wearable computer.

FIG. 5 is a transparent view of an example of a haptic effect device 100 comprising a wearable computer 500. In an example, haptic effect device 100 may comprise substrate 202 which is transparent in FIG. 5 to show array 204 of microdroplets 214. Membrane 206 may be in contact with a user's wrist. Thus, one or more haptic effects as described above may be communicated through membrane 206 to a user wearing wearable computer 500. In an example, wearable computer 500 may be a navigation device wherein haptic effects may enhance navigation directions. For example, in conjunction with a particular direction, such as forward, backward, left and/or right, microdroplets 214 may be excited sequentially in a corresponding direction providing a sensation to a user of a wave of haptic signals indicating of microdroplets 214 moving in the particular direction, such as from left to right. Arrows 502 and/or 504 show examples of the directions sequential excitation or vibration of microdroplets may move. However, many other directions and patterns of microdroplets 214 are possible.

In another example, wearable computer 500 may be a mobile communication device configured to provide a discrete email and/or message notification with a pattern of spatial/temporal haptic output. The pattern of microdroplet 214 haptic output may be correlated to music or sound to convey a "mood" of the message. Such haptic output may include temperature change.

In another example, wearable computer 500 may be a health monitoring device configured to provide a feedback to a user regarding sensor data associated with monitored health conditions. For example, the pattern of microdroplet 214 haptic output may be correlated a heartbeat to communicate beats per minute haptically.

In another example, haptic effect device 100 may comprise a video game controller. Buttons on haptic effect device 100 may comprise haptic effect generators 112. A user may be able to feel microdroplets 214 through membrane 206 on the buttons which may enhance game feedback to the user.

Figure 6:
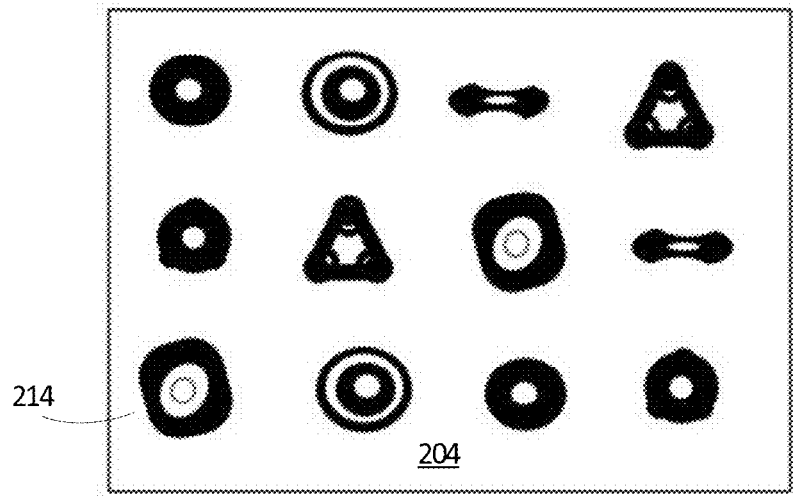
FIG. 6 illustrates several examples of shapes that one or more microdroplets may take.

FIG. 6 illustrates several shapes that an example array 204 of one or more microdroplets 214 may take. Such varied shapes may be generated by controlling actuation frequencies of substrate 202, surface 402 characteristics, surface interaction between microdroplets 214, liquid physical properties of the microdroplets 214, contact properties between microdroplets 214, interactions between microdroplets 214 and an underlying solid surface 402 of substrate 202 and/or the like or a combination thereof may impact shape, movement, vibration of microdroplets 214.

Figure 7:
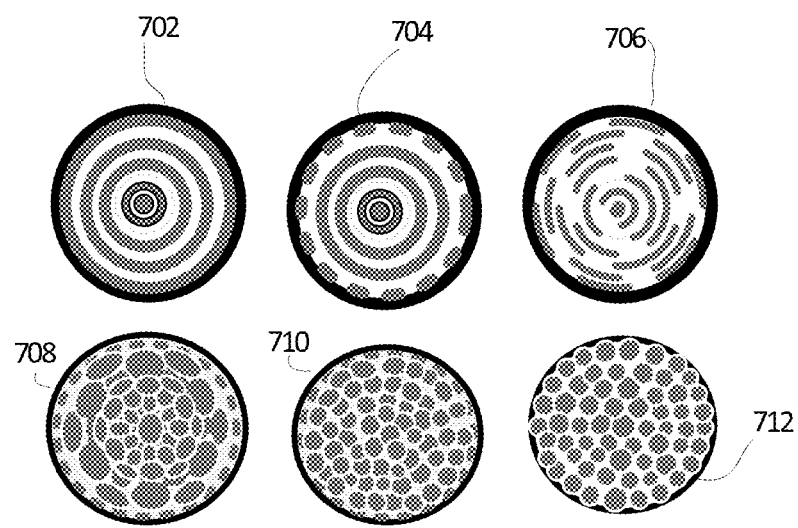
FIG. 7 illustrates several additional examples of shapes that one or more microdroplets may take.

FIG. 7 illustrates several additional shapes that one or more of microdroplets 214 may take. Such varied shapes may be generated by controlling actuation frequencies of substrate 202, surface 402 characteristics, surface interaction between microdroplets 214, liquid physical properties of the microdroplets 214, contact properties between microdroplets 214, interactions between microdroplets 214 and an underlying solid surface 402 of substrate 202 and/or the like or a combination thereof may impact shape, movement, vibration of microdroplets 214. As shown, microdroplet 702 may comprise axisymmetric waves, microdroplet 704 may comprise incipient azimuthal waves, microdroplet 706 may comprise an axisymmetric breakdown, microdroplet 708 may comprise comprises a lattice pattern, microdroplet 710 may comprise a lattice breakdown and microdroplet 712 may comprise a pre-ejection pattern.

Figure 8A:
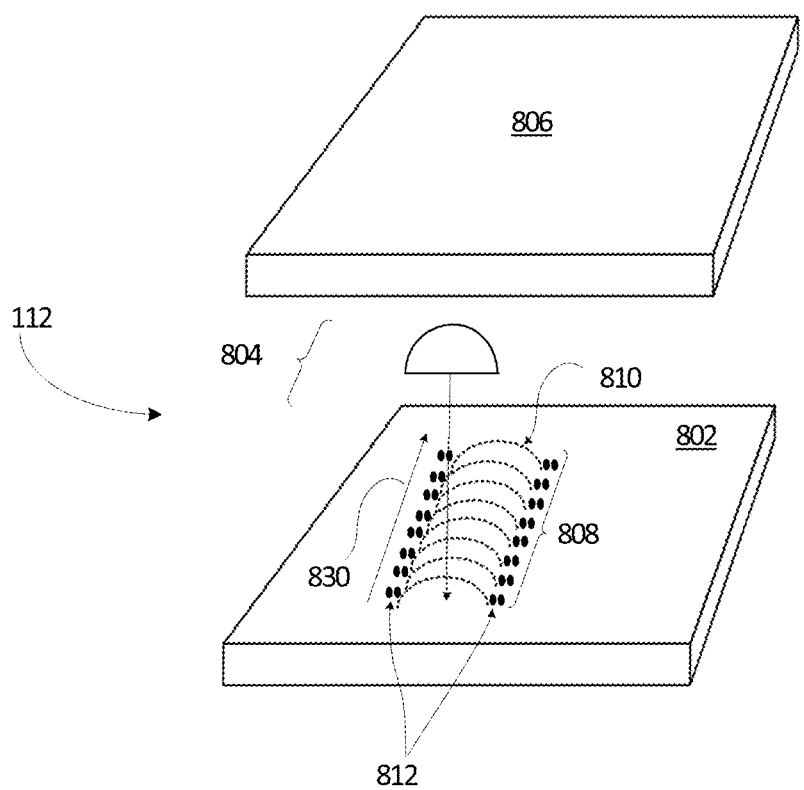
FIG. 8A illustrates an exploded view of an example of a haptic effect generator comprising three layers.

FIG. 8 illustrates an exploded view of haptic effect generator 112 comprising three layers including a substrate 802, a microdroplet layer 804 and a membrane 806. Membrane 806 may comprise a soft polymer and/or another flexible material. In an example, microdroplet 814 may be disposed on a texture ratchet 808. Texture ratchet 808 may be composed of a series of arced rungs 810. Texture ratchet 808 may be etched in substrate 802. Substrate 802 may comprise a hydrophobic substance such as silicon coated with fluoro-octyl-trichlorosilane (FOTS). Texture ratchet 308 may, alternatively, be molded in elastomers or other materials. Adjacent pillar arrays 812 may form a microscopically rough superhydrophobic surface. In an example, microdroplet 814 may be induced to move along ratchet 808 in the direction of arrow 830. Such directional movement of microdroplet 814 may be sensed by a user through membrane 806. Movement of microdroplet 814 may be induced by interaction between microdroplet 814 and texture ratchet 808 during vibration. Vibrations may be driven by actuator 110. Alternatively, ratchet 808 may utilize saw-tooth geometries and vibrations or anisotropic nanostructures to induce asymmetry for liquid transport. Transport mechanisms vary widely, with examples including acoustic vibrations, electrowetting, superparamagnetism, and the Leidenfrost effect, or the like or a combination thereof.

Figure 8B:
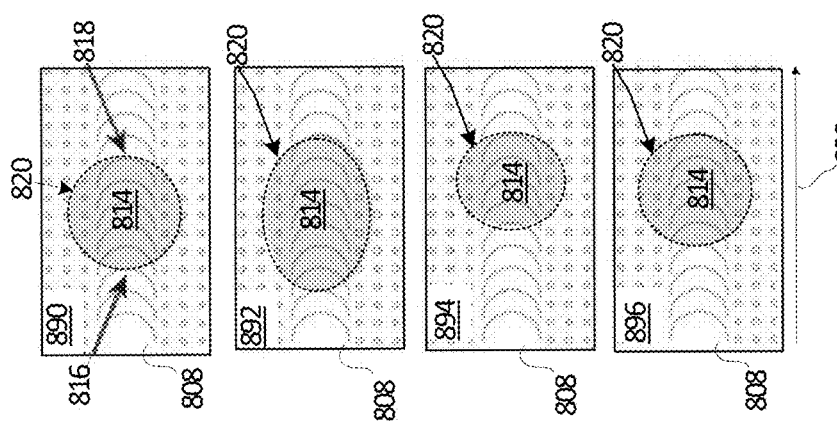
FIG. 8B is a schematic top view of an example of a microdroplet moving along a texture ratchet.

FIG. 8B is a schematic top view of an example of microdroplet 814 moving along texture ratchet 808. Texture ratchet 808 may comprise several rungs 810. In an example, during vibration and at equilibrium, footprint 820 of microdroplet 814 may align with an arced rung along its leading edge 818, while its trailing edge 816 may cross several rungs 810. Microdroplet 814 may start at equilibrium 890. During a wetting phase 892, footprint 820 of microdroplet 814 may expand as ratchet 808 accelerates upwards during vibration. During a dewetting phase 894, footprint 820 of microdroplet 814 may contract as ratchet 808 accelerates downwards during vibration. Returning to equilibrium 896 after an oscillation cycle, microdroplet 814 may move a distance along texture ratchet 808 in the direction of arrow 830. In another example, a texture ratchet may be configured in a shape such as a circle, figure eight, square, a wave and/or other non-linear path or the like or a combination thereof.

Figure 9:
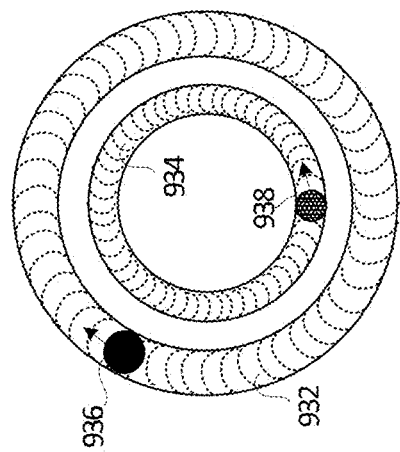
FIG. 9 is a schematic top view of an example of concentric circular ratchets.

FIG. 9 is a schematic top view of an example of a circular ratchet 932 and circular ratchet 934. Ratchet 932 and 934 may be fabricated in a surface of substrate 202 and may be incorporated into haptic effect generator 112. In an example, texture ratchet 932 may comprise several rungs configured to move microdroplet 936 in a clockwise direction during vibration of substrate 202. In an example, texture ratchet 934 may comprise several rungs configured to move microdroplet 938 in a counterclockwise direction when vibrating. Thus, microdroplets 936 and 938 may be moving in opposite directions during vibration. A speed of revolution of around microdroplets 936 and 938 around circular ratchets 932 and 934 may be controlled by controlling factors such as frequency of the vibrations, composition of microdroplets 936 and 938, composition of substrate 802 and/or surface structures thereon and/or the like or combinations thereof. Composition and/or structure of ratchet 932 may be different from composition and/or structure of ratchet 934 such that microdroplet 936 may travel at a different speed than microdroplet 938. Movement of microdroplets 936 and 938 may be sensed through membrane 806 by a user. In an example, using surface modifications of substrate 802 to make the surface more hydrophobic or using particular topological patterns, patterns and/or paths taken by microdroplets 936 and 938 may be stabilized and may reduce the total power required to actuate the liquid in microdroplet 936 and 938 to different spatiotemporal patterns.

Figure 10:
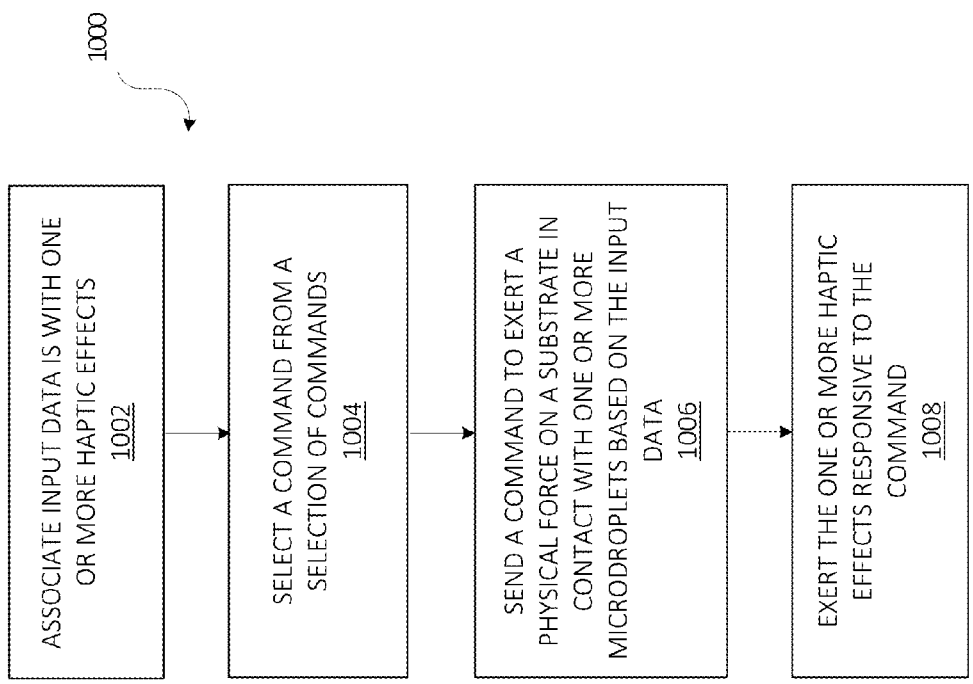
FIG. 10 illustrates an example of a process for outputting one or more haptic effects.

FIG. 10 illustrates an example of a process 1000 for outputting one or more haptic effects. Process 1000 begins at operation 1002 where processor 106 associates input data with one or more haptic effects. At operation 1004, processor 106 may select a command from a selection of commands each associated with one of a variety of two or more different haptic effects based on the input data. At operation 1006, processor 106 sends the command to actuator 110 via driver 108 to exert a physical force on substrate 202 in contact with one or more microdroplets 214 based on the input data. The different haptic effects may each comprise a different mode wherein the different modes may vary spatially, temporally, by frequency and/or by amplitude, or a combination thereof. The physical force may be selected from one or more physical forces including at least one of one or more vibrations, electrostatic forces, electrical signals, sound waves, heat, and/or compression. In an example, processor 106 may associate each commend of the selection of commands with one or more of the one or more physical forces and may associate each of the one or more physical forces with a particular haptic effect. At operation 1008, microdroplets 214 may exert the one or more haptic effects responsive to the command.

Figure 11:
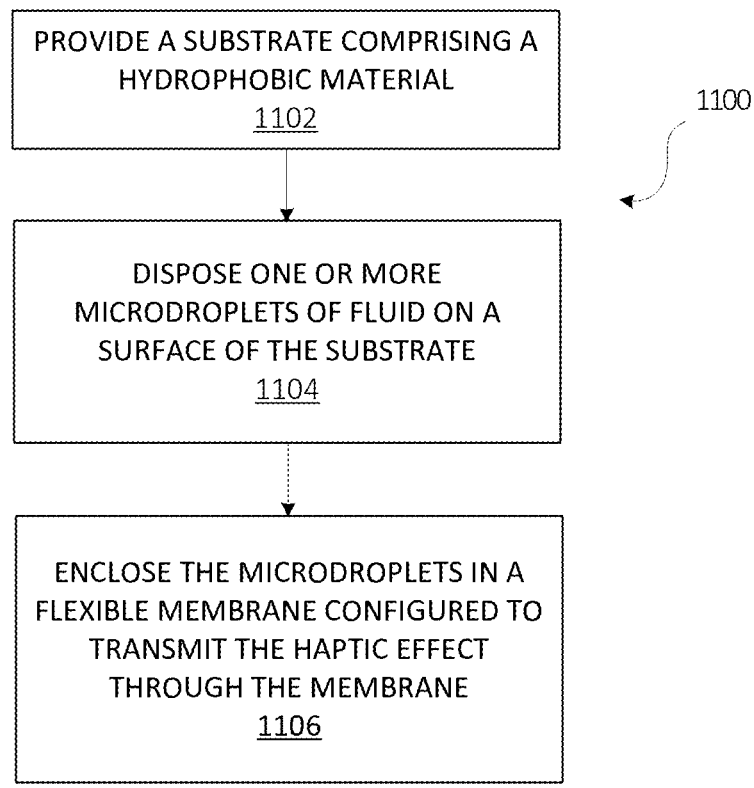
FIG. 11 illustrates an example process for fabricating a haptic effect device.

FIG. 11 illustrates an example process 1100 for fabricating a haptic effect device. At operation 1102, a substrate comprising a hydrophobic material may be provided and configured to couple to an actuator configured to apply a physical force to the substrate based on input data. The hydrophobic material may be at least one of a polymer, elastomer, thermoplastic, polydimethylsiloxane (PDMS), silicon coated with fluoro-octyl-trichloro-silane (FOTS), polynorbornene, PDMS, Teflon™ (polytetrafluoroethylene), fluorinated polyolefins, and/or novolac resin. At operation 1104, one or more microdroplets of fluid may be disposed on a surface of the substrate wherein the one or more microdroplets are configured to output a haptic effect responsive to the physical force applied to the substrate by the actuator. The one or more microdroplets may comprise at least one of water, oil, and/or a collection of fine particles that behave as a liquid material. At operation 1106, the microdroplets may be enclosed in a flexible membrane over the substrate wherein the membrane is configured to transmit the haptic effect through the membrane. In an example, a structure may be fabricated on a surface of the substrate, wherein the structure is configured to control motion of the one or more microdroplets. The structure may be a texture ratchet.

Figure 12:
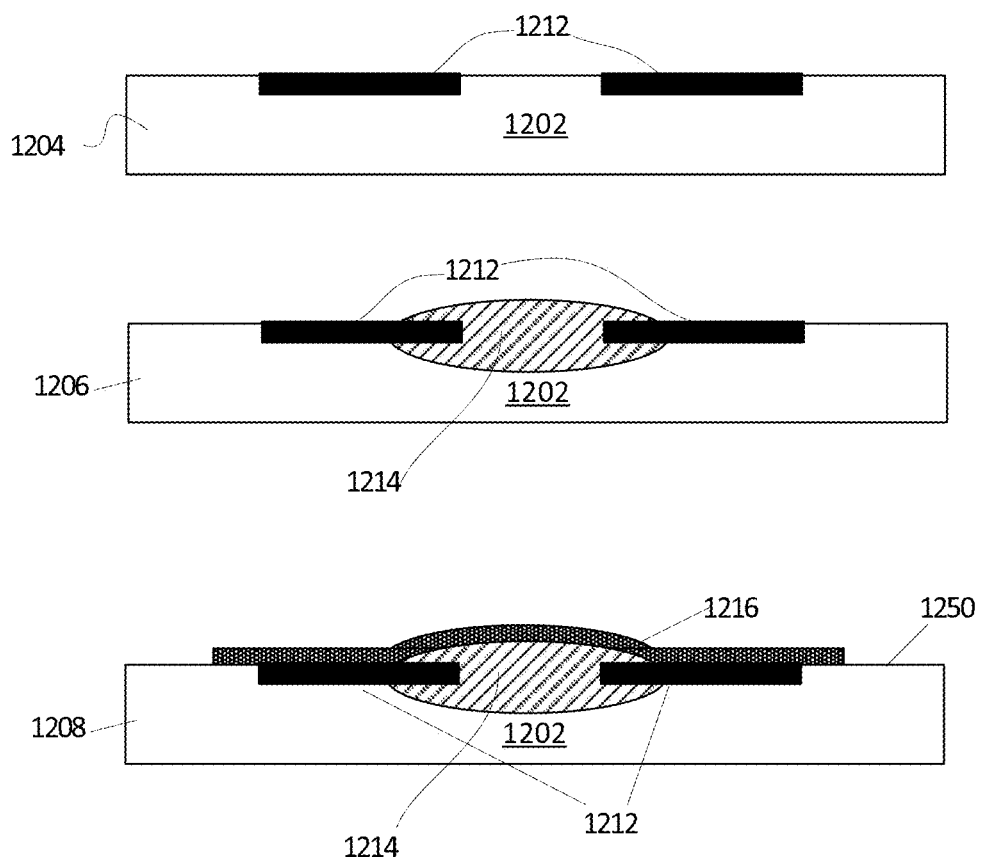
FIG. 12 illustrates an example process for fabricating a haptic effect device.

FIG. 12 illustrates an example process 1200 for fabricating a haptic effect device. At block 1204, a substrate 1202 may be provided and configured to couple to an actuator 110 which may be configured to apply a force to substrate 1202 based on input data received from user interface 102. Substrate 1202 may comprise electrodes 1212.

In an example, substrate 1202 may comprise a variety of materials such as silicon and/or may be hydrophobic and comprise at least one of a polymer, elastomer, thermoplastic, polydimethylsiloxane (PDMS), silicon coated with fluoro-octyl-trichloro-silane (FOTS), polynorbornene, PDMS, Teflon™ (polytetrafluoroethylene), fluorinated polyolefins, and/or novolac resin. At block 1206, a microdroplet 1214 of fluid may be disposed on a top surface 1250 of substrate 1202 at a predefined location with a surface preparation. Microdroplet 1214 may be configured to output a haptic effect responsive to the force applied to substrate 1202 by actuator 110 and/or by a signal received via one or more electrodes 1212. In an example, the one or more microdroplets 1214 may comprise at least one of water, oil, and/or a collection of fine particles that behave as a liquid material.

At block 1208, microdroplet 1214 may be enclosed in a flexible membrane 1216. Membrane 1216 may seal microdroplet 1214. Membrane 1216 may be configured to transmit haptic effect(s) therethrough. In an example, a structure may be fabricated on a surface of the substrate 1202, wherein the structure is configured to control motion of the one or more microdroplets. The structure may be a texture ratchet.

In an example, processor 106 and/or sensor actuator fusion core 107 and/or memory 118 may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processor 106 and/or sensor actuator fusion core 107 and/or memory 118 may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a conventional rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or the like, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

Disclosed herein are examples of one or more devices to output a haptic effect, that may comprise a haptic effect generator comprising one or more microdroplets of a fluid configured to output a haptic effect, and a substrate configured to control movement of the one or more microdroplets of fluid and an actuator coupled to the haptic effect generator configured to exert one or more forces on the substrate to cause the one or more microdroplets of fluid to output the haptic effect. The one or more devices may further comprise a membrane coupled to the substrate and configured to enclose the one or more microdroplets, wherein the membrane is configured to be flexible and to transmit the haptic effect through the membrane. The one or more devices may further comprise a mode of the haptic effect that may be based on at least one of frequency of vibration of the substrate, frequency of vibration transmitted to the one or more microdroplets, a number of frequencies of vibration transmitted to the one or more microdroplets, a composition of the substrate, a presence of a surface structure on the substrate, a composition of the one or more microdroplets, electrostatic forces between the one or more microdroplets and the substrate, or combinations thereof. The one or more devices may further comprise a user interface, a sensor, or combinations thereof, wherein the haptic effect corresponds to a particular input detected by the user interface, sensing of a particular physical phenomena by the sensor, or combinations thereof. The substrate may further comprise a texture ratchet, wherein the texture ratchet is configured to move the one or more microdroplets in a particular direction. In an example, the texture ratchet may be configured to move the one or more microdroplets in a circle, in a straight line, along a non-linear path, or combinations thereof. The texture ratchet may be further configured to move one microdroplet in a first circle in a clockwise direction and configured to move another microdroplet in a second circle in a counterclockwise direction. The substrate may comprise a hydrophobic material or a hydrophilic material, or a combination thereof. The hydrophobic material may comprise at least one of a polymer, elastomer, thermoplastic, polydimethylsiloxane (PDMS), silicon coated with fluoro-octyl-trichloro-silane (FOTS), polynorbornene, Teflon™ (polytetrafluoroethylene), fluorinated polyolefins, novolac resin, or combinations thereof. The fluid may comprise at least one of water, oil, fluorocarbon, silicone oil, bio-compatible silicone oil or a collection of fine particles that behave as a liquid material, or the like or combinations thereof. In an example, the water, oil, fluorocarbon, silicone oil, bio-compatible silicone oil or the collection of fine particles that behave as a liquid material, or combinations thereof may be charged. In an example, the device may comprise a mobile phone, a tablet, a notebook, a personal computer, a laptop computer, an Ultrabook™ system, a slate device, a wearable computer, or combinations thereof. In an example, the one or more microdroplets may comprise an array disposed on a top surface of the substrate.

Disclosed herein are examples of one or more methods to output one or more haptic effects, that may comprise associating, by a processor, input data with one or more haptic effects and sending, by the processor, a command to exert a force on a substrate in contact with one or more microdroplets based on the input data to cause the microdroplets to exert the one or more haptic effects. The one or more methods may further comprise selecting, by the processor, the command from a selection of commands each associated with one of a variety of two or more different haptic effects. In an example the different haptic effects each may comprise a different mode and wherein the different modes vary spatially, temporally, by frequency, by amplitude, or combinations thereof. The one or more methods may further comprise associating, by the processor, the command with one or more forces and associating, by the processor, the one or more forces with a particular haptic effect. In an example, the one or more forces may include at least one of one or more vibrations, electrostatic forces, electrical signals, sound waves, heat, or compression.

Disclosed herein are examples of one or more processes for fabricating a haptic effect device that may comprise disposing one or more microdroplets of fluid on a surface of a substrate, wherein the substrate comprises a hydrophobic material, a hydrophilic material or a combination thereof and is configured to couple to an actuator configured to apply a force to the substrate based on input data, wherein the one or more microdroplets are configured to output a haptic effect responsive to the force applied to the substrate by the actuator and enclosing the one or more microdroplets in a flexible membrane over the substrate wherein the membrane is configured to transmit the haptic effect through the membrane. The one or more processes may further comprise fabricating a structure on a surface of the substrate, wherein the structure is configured to control motion of the one or more microdroplets. In an example, the surface of the substrate may comprise a region of hydrophobic material and a region of hydrophilic material. In an example, the hydrophobic material may comprise a polymer, elastomer, thermoplastic, polydimethylsiloxane (PDMS), silicon coated with fluoro-octyl-trichloro-silane (FOTS), polynorbornene, Teflon™ (polytetrafluoroethylene), fluorinated polyolefins, novolac resin, or combinations thereof. In an example, the fluid may comprise water, oil, a collection of fine particles that behave as a liquid material, or a combination thereof.

Disclosed herein are examples of one or more non-transitory computer-readable media comprising instructions to output a haptic effect that, in response to execution of the instructions by a computing device, may enable the computing device to associate input data with one or more haptic effects and send a command to exert a force on a substrate in contact with one or more microdroplets based on the input data to cause the microdroplets to exert the one or more haptic effects. The one or more non-transitory computer-readable media may further comprise instructions to output the haptic effect that, in response to execution of the instructions by a computing device, may further enable the computing device to select the command from a selection of commands each associated with one of a variety of two or more different haptic effects.

Disclosed herein is an apparatus comprising means to perform a method as discussed in any section above or in the figures. Disclosed herein is a machine-readable storage including machine-readable instructions, when executed, to implement a method or realize an apparatus as disclosed in any section above or in the figures. Disclosed herein is a machine-readable medium including code, when executed, to cause a machine to perform the method as disclosed in in any section above or in the figures.

Having described and illustrated the principles of examples, it should be apparent that the examples may be modified in arrangement and detail without departing from such principles. We claim all modifications and variations coming within the spirit and scope of the following claims.

What is claimed is:

1. A device to output a haptic effect, comprising:
   a haptic effect generator comprising one or more microdroplets of a fluid configured to output a haptic effect, and a substrate configured to control movement of the one or more microdroplets of fluid; and
   an actuator coupled to the haptic effect generator configured to exert one or more forces on the substrate to cause the one or more microdroplets of fluid to output the haptic effect;
   wherein the actuator causes the microdroplets to resonate at selected frequencies to generate multimodal shapes in the microdroplets to provide a multimodal haptic effect output.

2. The device of claim 1, further comprising:
   a membrane coupled to the substrate and configured to enclose the one or more microdroplets, wherein the membrane is configured to be flexible and to transmit the haptic effect through the membrane.

3. The device of claim 1, wherein a mode of the haptic effect is based on at least one of frequency of vibration of the substrate, frequency of vibration transmitted to the one or more microdroplets, a number of frequencies of vibration transmitted to the one or more microdroplets, a composition of the substrate, a presence of a surface structure on the substrate, a composition of the one or more microdroplets, electrostatic forces between the one or more microdroplets and the substrate, or combinations thereof.

4. The device of claim 1, further comprising a user interface, a sensor, or combinations thereof, wherein the haptic effect corresponds to a particular input detected by the user interface, sensing of a particular physical phenomena by the sensor, or combinations thereof.

5. The device of claim 1, wherein the substrate comprises a texture ratchet, wherein the texture ratchet is configured to move the one or more microdroplets in a particular direction.

6. The device of claim 5, wherein the texture ratchet is configured to move the one or more microdroplets in a circle, in a straight line, along a non-linear path, or combinations thereof.

7. The device of claim 5, wherein the texture ratchet is configured to move one microdroplet in a first circle in a clockwise direction and configured to move another microdroplet in a second circle in a counterclockwise direction.

8. The device of claim 1, wherein the substrate comprises a hydrophobic material or a hydrophilic material, or a combination thereof.

9. The device of claim 8, wherein the hydrophobic material is at least one of a polymer, elastomer, thermoplastic, polydimethylsiloxane (PDMS), silicon coated with fluoro-octyl-trichloro-silane (FOTS), polynorbornene, Teflon™ (polytetrafluoroethylene), fluorinated polyolefins, novolac resin, or combinations thereof.

10. The device of claim 1, wherein the fluid comprises at least one of water, oil, fluorocarbon, silicone oil, bio-compatible silicone oil or a collection of fine particles that behave as a liquid material, or combinations thereof.

11. The device of claim 10, wherein the oil, fluorocarbon, silicone oil, bio-compatible silicone oil or the collection of fine particles that behave as a liquid material, or combinations thereof are charged.

12. The device of claim 1, wherein the device comprises a mobile phone, a tablet, a notebook, a personal computer, a laptop computer, an Ultrabook™ system, a slate device, a wearable computer, or combinations thereof.

13. The device of claim 1, wherein the one or more microdroplets comprise an array disposed on a top surface of the substrate.

14. A method to output one or more haptic effects, comprising:
   associating, by a processor, input data with one or more haptic effects; and
   sending, by the processor, a command to exert a force on a substrate in contact with one or more microdroplets based on the input data to cause the microdroplets to exert the one or more haptic effects;
   wherein the force causes the microdroplets to resonate at selected frequencies to generate multimodal shapes in the microdroplets to provide a multimodal haptic effect output.

15. The method of claim 14, further comprising selecting, by the processor, the command from a selection of commands each associated with one of a variety of two or more different haptic effects.

16. The method of claim 15, wherein the different haptic effects each comprise a different mode and wherein the different modes vary spatially, temporally, by frequency, by amplitude, or combinations thereof.

17. The method of claim 14, further comprising:
   associating, by the processor, the command with one or more forces; and
   associating, by the processor, the one or more forces with a particular haptic effect.

18. The method of claim 17, wherein the one or more forces include at least one of one or more vibrations, electrostatic forces, electrical signals, sound waves, heat, or compression.

19. A process for fabricating a haptic effect device, comprising:

disposing one or more microdroplets of fluid on a surface of a substrate, wherein the substrate comprises a hydrophobic material, a hydrophilic material or a combination thereof and is configured to couple to an actuator configured to apply a force to the substrate based on input data, wherein the one or more microdroplets are configured to output a haptic effect responsive to the force applied to the substrate by the actuator; and enclosing the one or more microdroplets in a flexible membrane over the substrate wherein the membrane is configured to transmit the haptic effect through the membrane;

wherein the microdroplets resonate at selected frequencies to generate multimodal shapes in the microdroplets to provide a multimodal haptic effect output in response to the force.

20. The process of claim 19, further comprising:

fabricating a structure on a surface of the substrate, wherein the structure is configured to control motion of the one or more microdroplets.

21. The process of claim 20, wherein the surface of the substrate comprises a region of hydrophobic material and a region of hydrophilic material.

22. The process of claim 19, wherein the hydrophobic material is a polymer, elastomer, thermoplastic, polydimethylsiloxane (PDMS), silicon coated with fluoro-octyl-trichloro-silane (FOTS), polynorbornene, Teflon™ (polytetrafluoroethylene), fluorinated polyolefins, novolac resin, or combinations thereof.

23. The process of claim 19, wherein the fluid comprises water, oil, a collection of fine particles that behave as a liquid material, or a combination thereof.

24. A non-transitory computer-readable medium comprising instructions to output a haptic effect that, in response to execution of the instructions by a computing device, enable the computing device to:

associate input data with one or more haptic effects; and send a command to exert a force on a substrate in contact with one or more microdroplets based on the input data to cause the microdroplets to exert the one or more haptic effects wherein the force causes the microdroplets to resonate at selected frequencies to generate multimodal shapes in the microdroplets to provide a multimodal haptic effect output.

25. The non-transitory computer-readable medium of claim 24 further comprising instructions to output the haptic effect that, in response to execution of the instructions by a computing device, further enable the computing device to select the command from a selection of commands each associated with one of a variety of two or more different haptic effects.

* * * * *